(12) United States Patent
Park et al.

(10) Patent No.: US 10,884,404 B2
(45) Date of Patent: Jan. 5, 2021

(54) METHOD OF PREDICTING PLANT DATA AND APPARATUS USING THE SAME

(71) Applicant: DOOSAN HEAVY INDUSTRIES & CONSTRUCTION CO., LTD., Changwon-si (KR)

(72) Inventors: Jee Hun Park, Gwangmyeong-si (KR); Hyun Sik Kim, Gimpo-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 292 days.

(21) Appl. No.: 16/009,201

(22) Filed: Jun. 15, 2018

(65) Prior Publication Data

US 2019/0072947 A1 Mar. 7, 2019

(30) Foreign Application Priority Data

Sep. 1, 2017 (KR) .......................... 10-2017-0112165

(51) Int. Cl.
  *G05B 23/02* (2006.01)
  *G05B 17/02* (2006.01)
  (Continued)

(52) U.S. Cl.
  CPC ....... *G05B 23/0283* (2013.01); *G05B 13/048* (2013.01); *G05B 17/02* (2013.01);
  (Continued)

(58) Field of Classification Search
  CPC .............. G05B 23/0283; G05B 23/024; G05B 13/048; G05B 17/02; G05B 21/02; G05B 23/0243
  See application file for complete search history.

(56) References Cited

U.S. PATENT DOCUMENTS

| 6,216,066 B1 * | 4/2001 | Goebel | G05B 23/0232 340/438 |
| 8,204,697 B2 * | 6/2012 | Garvey | G01V 1/40 702/34 |

(Continued)

FOREIGN PATENT DOCUMENTS

| JP | 2013-218725 A | 10/2013 |
| JP | 2015-088079 A | 5/2015 |

OTHER PUBLICATIONS

English Translation of the Korean Office Action dated Jan. 31, 2019 in connection with Korean Patent Application No. 10-2017-0112165 which corresponds to the above-referenced U.S. application.

(Continued)

*Primary Examiner* — Mohammad K Islam
(74) *Attorney, Agent, or Firm* — Invenstone Patent, LLC

(57) ABSTRACT

A method of predicting plant data in a system generates prediction data based on a plant prediction model and for detecting anomalies of the plant by comparing the prediction data with measurement data. The method can provide precise prediction data in a normal state even though the measurement data contains data in an anomalous state. Anomaly/fault prediction accuracy is enhanced by providing precise prediction data in the normal state. An apparatus using the method includes a plant modeling unit for generating a plant prediction model based on k-nearest neighbors (k-NN) by modeling a plant based on measurement data of multiple tags; and a prediction data generating unit for measuring similarity between the plant prediction model and the measurement data, determining a parameter k value based on the similarity, and generating plant normal state prediction data based on the determined parameter k value and the measured similarity.

14 Claims, 5 Drawing Sheets

(51) Int. Cl.
  *G05B 21/02* (2006.01)
  *G05B 13/04* (2006.01)
(52) U.S. Cl.
  CPC ........... *G05B 21/02* (2013.01); *G05B 23/024* (2013.01); *G05B 23/0243* (2013.01)

(56) References Cited

U.S. PATENT DOCUMENTS

| | | | | |
|---|---|---|---|---|
| 8,352,049 B2* | 1/2013 | Hsiung | ................ | G05B 19/042 |
| | | | | 700/47 |
| 8,849,586 B1* | 9/2014 | Garvey | ................ | G06N 20/00 |
| | | | | 702/34 |
| 9,336,902 B2* | 5/2016 | Jeong | ................ | G11C 29/025 |
| 2010/0198556 A1* | 8/2010 | Kost | ................ | G05B 23/024 |
| | | | | 702/183 |
| 2012/0041575 A1* | 2/2012 | Maeda | ................ | G05B 23/024 |
| | | | | 700/80 |
| 2015/0160098 A1* | 6/2015 | Noda | ................ | G05B 23/024 |
| | | | | 702/35 |
| 2017/0091637 A1* | 3/2017 | Chae | ................ | G06N 5/003 |

OTHER PUBLICATIONS

English Translation of 2004 Proceedings of the Autumn Conference, Korean Statistical Society.

* cited by examiner

[FIG. 1]
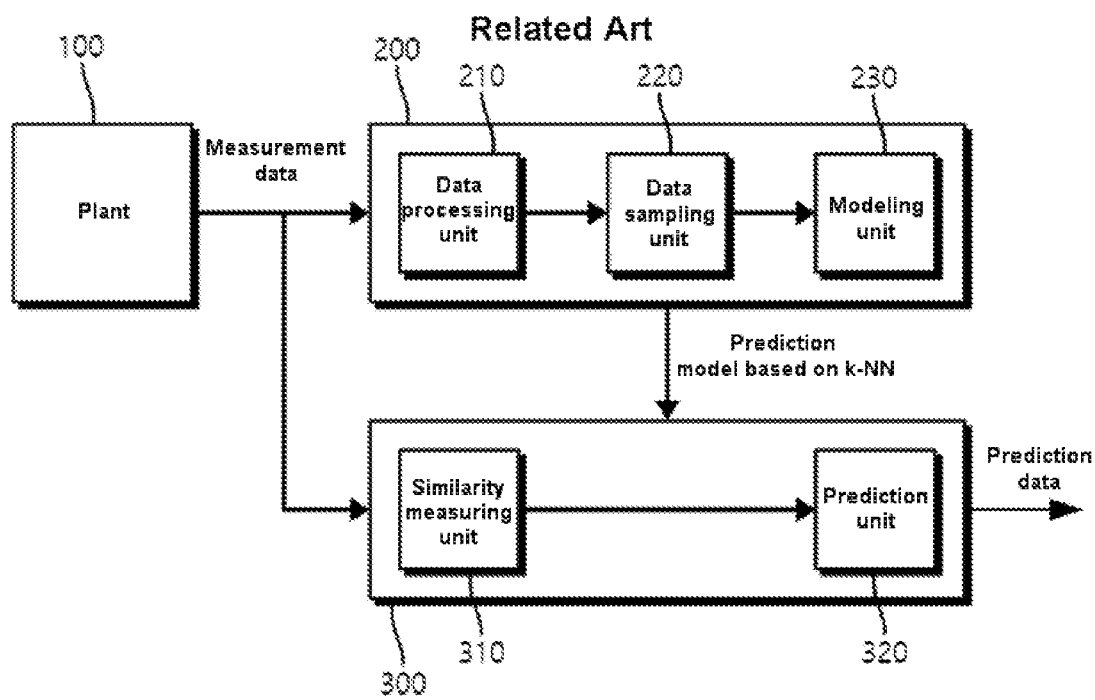

[FIG. 2]
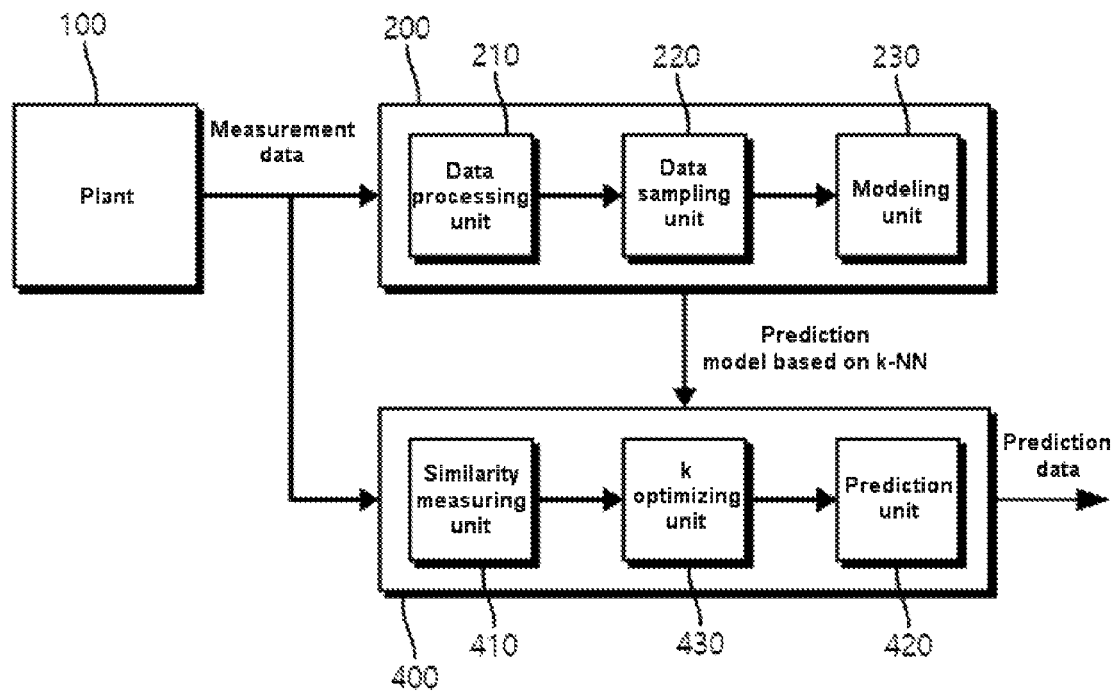

[FIG. 3]
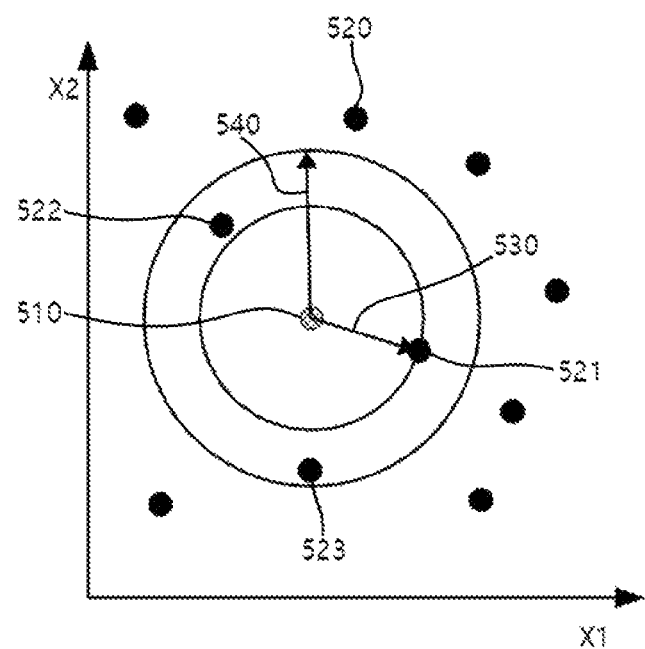

[FIG. 4]
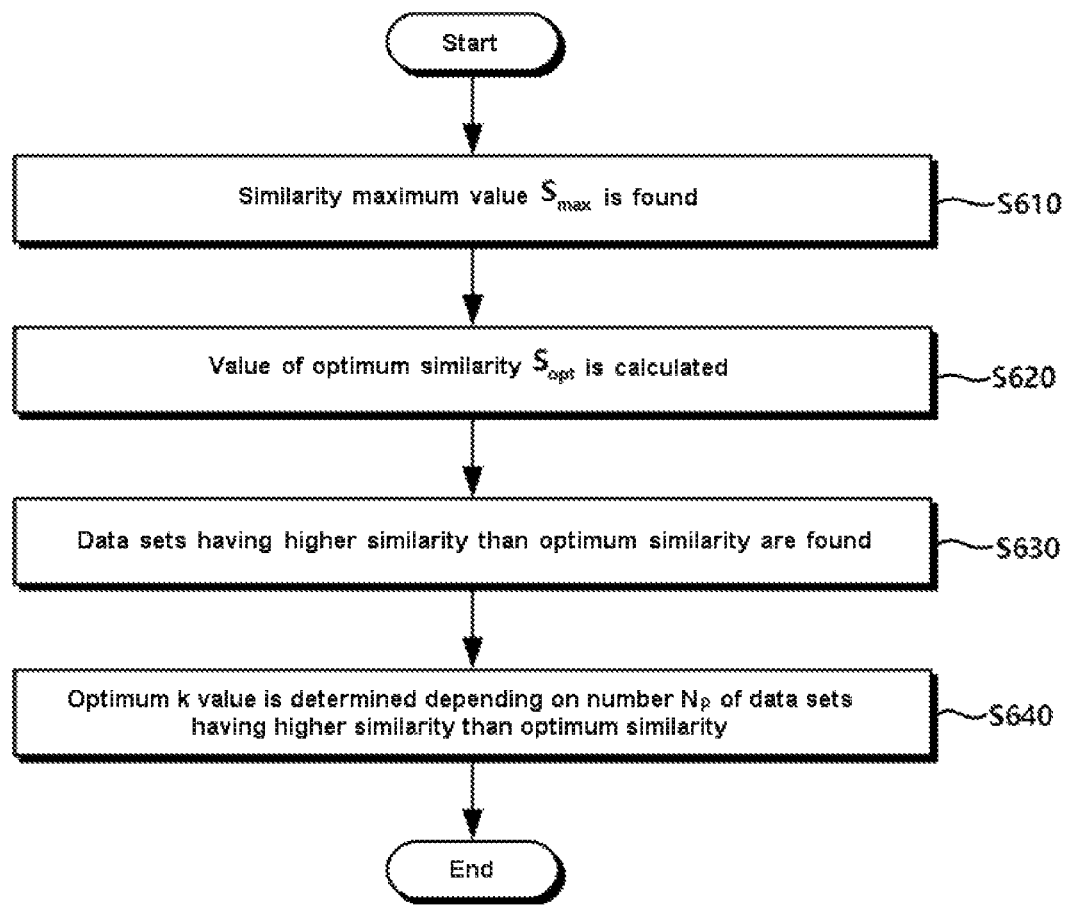

[FIG. 5]
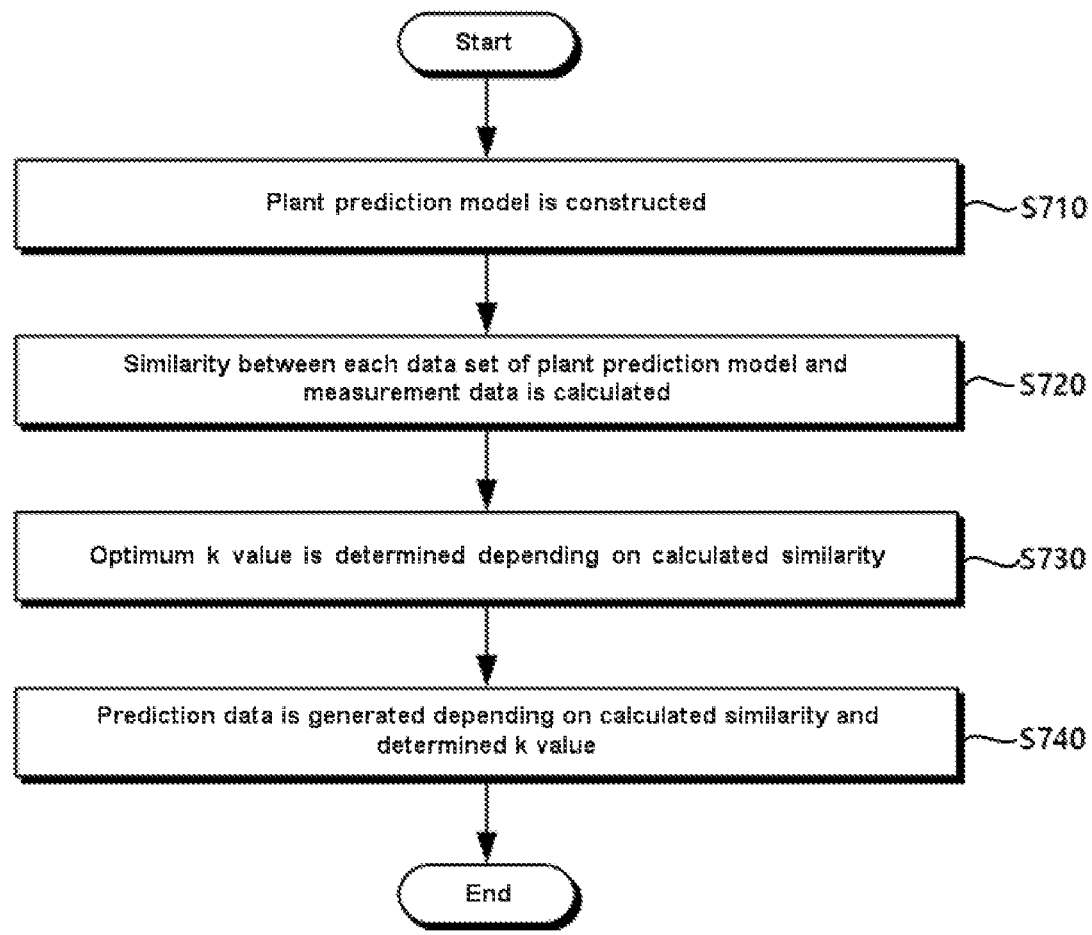

METHOD OF PREDICTING PLANT DATA AND APPARATUS USING THE SAME

CROSS REFERENCE TO RELATED APPLICATIONS

The present application claims priority to Korean Patent Application 10-2017-0112165, filed Sep. 1, 2017, the entire contents of which is incorporated herein for all purposes by this reference.

BACKGROUND OF THE INVENTION

Field of the Invention

The present invention relates generally to an apparatus and method of predicting plant data, the apparatus and method for precision in prediction data on a plant by using an advanced similarity algorithm and a k optimization algorithm in a system for generating the prediction data on the plant based on a plant prediction model and for detecting anomalies of the plant by comparing the prediction data with measurement data.

Description of the Related Art

Generally, large-scale plants, such as power or chemical plants, etc., are operated in a complex connection with various types of hundreds of machines and electrical facilities. In order to secure reliability of such plants and normal operation thereof, it is necessary to continuously monitor anomalous signs which may result in accidents. Thus, a monitoring device that detects in real-time whether main components constituting the plant are damaged and that generates an alarm for an operator when anomalous signs are found on the components has been used.

That is, plant faults and other anomalies can damage the plant and cause undesired performance. Furthermore, if the plant is destroyed, people can be injured or killed, and environmental problems can be caused. Therefore, an early warning system is needed for early detection of faults.

Generally, the early warning system for warning of faults or the possibility of faults is based on a plant model, which is that the plant is modeled. The system receives and stores observation signals measured in real time by using a sensor, etc. in the plant, and based on this, distinguishes anomalous signals to inform thereof in advance. Therefore, in the system for detecting faults, the most important part may be plant modeling and a prediction method based thereon.

The most widely used method is a k-nearest neighbors (k-NN) algorithm. In a k-NN algorithm, prediction performance varies greatly depending on model performance, and thus necessities an extremely elaborate model. To this end, experts should analyze data and execute modeling through data pre-processing. However, in practice, experts are unable to always execute modeling, and thus it is highly likely that the k-NN based prediction is inaccurate. Therefore, it is necessary to develop a technology capable of enhancing prediction performance even with poor models.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention is intended to propose an apparatus and method of predicting plant data, the apparatus and method being capable of enhancing prediction performance by developing a prediction method.

Particularly, the present invention is intended to propose an apparatus and method of predicting plant data, the apparatus and method being capable of maximizing prediction accuracy by providing a more developed similarity calculation method than a conventional k-NN based apparatus and method of predicting plant data and by providing a k optimization method.

In order to achieve the above object, according to one aspect of the present invention, there is provided an apparatus for predicting data. The apparatus may include a plant modeling unit for generating a plant prediction model based on k-nearest neighbors (k-NN) by modeling a plant based on measurement data of multiple tags; and a prediction data generating unit for measuring a similarity between the plant prediction model and the measurement data, determining a parameter k value based on the similarity, and generating plant normal state prediction data based on the determined parameter k value and the measured similarity.

The plant prediction model may contain multiple data sets, each data set having a value for each tag of the multiple tags. The prediction data generating unit may include a similarity measuring unit for determining a similarity for each data set by measuring a similarity between each data set of the plant prediction model and the measurement data; a k optimizing unit for determining a parameter k to be used in generating the prediction data, based on the determined similarity for each data set by the similarity measuring unit; and a prediction unit for selecting k data sets in order of decreasing similarity, based on the similarity for each data set and the determined parameter k, and for generating the prediction data based on the selected k data sets.

The similarity measuring unit may further determine the similarity for each data set based on a difference between a value of each tag in each data set of the plant prediction model and a value of a corresponding tag of the measurement data, and on a preset deviation for each tag.

As an embodiment, the similarity for each data set may be determined according to the equation $$s_j = \frac{\sum_{i=1}^{n} \exp\left(-\frac{(Z_{i,j} - x_i)^2}{2\sigma_i^2}\right)}{n}$$

where $S_j$ denotes the similarity of a data set j, $Z_{i,j}$ denotes a value of a tag i of the data set j, $x_i$ denotes a value of the tag i of the measurement data, a, denotes the preset deviation of the tag i, and n denotes a number of tags.

The k optimizing unit may determine the parameter k to be used in generating the prediction data by setting an optimum similarity; searching the multiple data sets for data sets having higher similarity than the optimum similarity and counting a number of data sets having higher similarity; and comparing the counted number with a preset maximum value and a preset minimum value of the parameter k.

As an embodiment for setting the optimum similarity, the k optimizing unit may obtain a similarity maximum value $S_{max}$ by comparing similarities of the data sets, and set the optimum similarity by subtracting a preset parameter from the similarity maximum value, wherein the parameter is a value between zero and one.

The prediction unit may generate the prediction data by a weighted average in which values of each tag in the selected k data sets are multiplied by weights proportional to similarities of the data sets, and the result is averaged.

The above apparatus may further include an anomaly determining unit for determining anomalies of the plant by comparing the prediction data with the measurement data.

According to another aspect of the present invention, there is provided a method of predicting data. The method may include generating a plant prediction model based on k-nearest neighbors (k-NN) by modeling a plant based on measurement data of multiple tags; and measuring a similarity between the plant prediction model and the measurement data, determining a parameter k value based on the similarity, and generating plant normal state prediction data based on the determined parameter k value and the measured similarity.

The method may further include determining a similarity for each data set by measuring a similarity between each data set of the plant prediction model and the measurement data; determining a parameter k to be used in generating the prediction data, based on the similarity for each data set; and selecting k data sets in order of decreasing similarity based on the similarity for each data set and the parameter k, and generating the prediction data based on the selected k data set.

The similarity determining may include determining the similarity for each data set based on a difference between a value for each tag in each data set of the plant prediction model and a value of a corresponding tag of the measurement data, and on a preset deviation for each tag. Furthermore, the similarity for each data set may be determined according to the above equation.

The parameter k to be used in generating the prediction data may be determined by setting an optimum similarity; searching the multiple data sets for data sets having higher similarity than the optimum similarity and counting a number of data sets having higher similarity; and comparing the counted number with a preset maximum value and a preset minimum value of the parameter k. Particularly, the optimum similarity may be set by obtaining a similarity maximum value by comparing similarities of the data sets and by subtracting a preset parameter from the similarity maximum value, wherein the parameter is a value between zero and one.

The generating of the prediction data may include generating the prediction data by a weighted average in which values of each tag in the selected k data sets are multiplied by weights proportional to similarities of the data sets, and the result is averaged.

The above method may further include determining anomalies of the plant by comparing the prediction data and the measurement data.

There is provided an apparatus having functions to be performed by a computer or a processor.

According to the present invention, even through an inaccurate model is constructed by a nonspecialist, prediction accuracy can be maximized by optimizing the similarity and the k value.

Also, by using the apparatus for predicting data proposed in the present invention, prediction performance can be enhanced and the occurrence of false alarms in plant management can be minimized.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a block diagram of a contemporary k-NN based apparatus for generating prediction data;

FIG. 2 is a block diagram of an apparatus for generating prediction data according to an embodiment of the present invention;

FIG. 3 is a graphical diagram illustrating a manner of obtaining an optimized k value;

FIG. 4 is a flow diagram of a method of obtaining an optimized k value according to an embodiment of the present invention; and FIG. 5 is a flow diagram of a method of predicting data according to an embodiment of the present invention.

DETAILED DESCRIPTION OF THE INVENTION

In order to clearly describe the present invention, parts not related to the description are omitted, and the same or similar elements are denoted by the same reference numerals throughout the specification.

Throughout the specification, when a part is referred to as being "connected" to another part, it includes not only being "directly connected", but also being "electrically connected" by interposing the other part therebetween. Also, when a part "includes" an element, it is noted that it further includes other elements, but does not exclude other elements, unless specifically stated otherwise.

When any part is referred to as being positioned "on" another part, it means the part is directly on the other part or above the other part with an intermediate part. In contrast, when any part is referred to as being positioned "directly on" another part, it means that there is no intermediate part between the two parts.

It is noted that although the terms "first", "second", "third", etc. may be used herein to describe various parts, components, regions, layers and/or sections, but are not limited thereto. These terms are only used to distinguish one part, component, region, layer or section from another part, component, region, layer or section. Thus, a first part, component, region, layer or section described below could be referred to as a second part, component, region, layer or section without departing from the scope of the present invention.

Technical terms used here are to only describe specific exemplary embodiments and are not intended to limit the present invention. Singular forms used here include plural forms unless phrases explicitly represent an opposite meaning. A meaning of "comprising" used in the specification embodies a specific characteristic, area, integer, step, operation, element and/or component and does not exclude presence or addition of another specific characteristic, area, integer, step, operation, element, and/or component.

Terms representing relative space, such as "below", "above", etc. may be used to more easily describe a relation between one portion and other portion shown in the drawings. Such terms are intended to include alternative meanings or operations of an apparatus in use as well as a meaning that is intended in the drawings. For example, when an apparatus is inverted in the drawings, a particular portion described as being "below" other portions is described as being "above" the portions. Therefore, an illustrative term "below" includes both up and down directions. An apparatus may be rotated by 90° or different angles, and a term representing relative space is accordingly interpreted.

Hereinafter, exemplary embodiments of the present invention will be described in detail with reference to the accompanying drawings such that the invention can be easily embodied by one of ordinary skill in the art to which this invention belongs. However, the present invention may be embodied in various different forms and should not be limited to the embodiments set forth herein.

Hereinafter, exemplary embodiments of an apparatus and method of predicting data and apparatus using the same according to the present disclosure will be described with reference to the drawings, in which like reference designations indicate the same or similar elements.

With respect to the present disclosure, it should be appreciated that a tag is a type of signal that may be detected or measured using a sensor or the like, including for example a signal indicating a differential pressure of an inlet filter, a turbine exhaust pressure, a temperature, etc., that may be directly obtained (e.g., sensed) or a signal indicating a calculated value, such as output power, based on the signal obtained by a sensor. A plurality of such sensors may be provided throughout a plant adopting the present invention.

Referring to FIG. 1, a contemporary k-NN based apparatus for generating prediction data may include a plant modeling unit 200 and a prediction data generating unit 300, each of which obtains measurement data from a plant 100.

The plant modeling unit 200 obtains measurement data from measurement of a plant 100 by using an array of sensors or similar detection and input devices (not shown), and generates a prediction model based on the measurement data. The prediction model represents a normal state of the plant. Here, the data obtained from measurements performed throughout the plant 100 by the sensor array contains data obtained from measurements performed over time, to include current and past data. The plant modeling unit 200 may update the prediction model every time the measurement data is input.

The plant modeling unit 200 may include a data processing unit 210, a data sampling unit 220, and a modeling unit 230. The plant modeling unit 200 is merely one embodiment, and various other conventional means of plant modeling exist.

The data processing unit 210 may extract only necessary data from the input measurement data received from the plant 100 for transmission to the modeling unit 230. For example, when an anomaly or fault occurs in the plant such that the input measurement data contains data related to an anomalous state rather than data related to the normal state, the data processing unit 210 may delete the anomaly-related measurement data so that such input data is not used for modeling. Alternatively, the data processing unit 210 may correct the anomalous data before transmission, by changing it into data of the normal state.

The data sampling unit 220 may receive current and/or past measurement data on the plant, sample the received data, and transmit the sampled data to the modeling unit 230. For example, when the amount of data being input to the modeling unit 230 is too burdensome to process or if unnecessary redundancy is present, the data sampling unit 220 may convert the input data to a reduced representation set of the characteristics. The data sampling unit 220 performs sampling for appropriately relevant information among the input data and transmits the information to the modeling unit 230 so as to perform a desired operation by using only a reduced representation value based on the extracted characteristic, that is, without transmitting the input data in its entirety.

In another embodiment of the data sampling unit 220, data sampling may be performed in order to generate new learning data (e.g., 2,000 pieces per tag) based on a specific characteristic from a combination of existing learning data (e.g., 2,000 pieces per tag) used for modeling in the modeling unit 230 and newly input measurement data (e.g., 288 pieces per tag). That is, the modeling unit 230 may arrange the above-described 2,228 pieces of data in a line according to the specific characteristic and may extract 2,000 pieces of data by performing sampling at regular intervals.

The modeling unit 230 performs modeling of the plant on the basis of the learning data generated through sampling by the data sampling unit 220, thereby generating a plant prediction model. Particularly, the modeling unit 230 may learn the learning data on basis of the k-NN algorithm to perform modeling of the plant. Here, the plant prediction model to output has m data sets, and each data set has values for n tags. Therefore, the plant prediction model may be represented by an n-by-m matrix. Here, m data sets may represent the values that the tags may have when the plant is in a particular state, or may represent the values of respective tags which are obtained by statistically processing only the measurement data collected at a particular time.

The plant prediction model generated by the plant modeling unit 200 is a basis for generating prediction data for each tag by the prediction data generating unit 300.

The prediction data generating unit 200 may include a similarity measuring unit 310 and a prediction unit 320. The similarity measuring unit 310 may measure and output similarity between each data set of the plant prediction model and the input measurement data, and the prediction unit 320 may generate and output prediction data for each tag by using k data sets with the highest similarity based on the result of similarity measurement.

For example, a plant prediction model Z may be composed of n rows and m columns, where n indicates the number of tags and m indicates data sets, and may be expressed as below.

$$Z = [Z_1 \ldots Z_m] = \begin{bmatrix} z_{1,1} & \cdots & z_{1,m} \\ \vdots & \ddots & \vdots \\ z_{n,1} & \cdots & z_{n,m} \end{bmatrix}$$

The input measurement data (X) may be represented by $X=[x_1 \ldots x_n]^T$ and the result of similarity (S) calculation by the similarity measuring unit 310 for each data set may be represented by $S=[s_1 \ldots s_m]$. When using the radial basis function (RBF) kernel, which is widely used in machine learning, a similarity $S_j$ for each data set may be obtained by the following Equation 1.

$$s_j(Z_j, X) = \exp\left(-\frac{\|Z_j - X\|^2}{2\sigma^2}\right) \qquad \text{[Equation 1]}$$

Based on the similarity calculated by the similarity measuring unit 310 with the above-described method, the prediction unit 320 may select k data sets having the highest similarity (when the value of $S_j$ is close to one, the similarity is high), and may obtain a combination average or a weighted average thereof so as to obtain final prediction data. Here, k and σ are values that may be preset by the operator.

Here, performance of the prediction data, which indicates how much the prediction data corresponds to the data obtained by measuring the plant in the normal state, is highly dependent on accuracy of the model generated by the plant modeling unit 200. Particularly, when using a k-NN algorithm, the performance varies largely according to the model. That is, the performance of the prediction data is extremely high when an accurate model is used, but the performance of the prediction data may be poor when an inaccurate model is used.

To solve the problem, namely, in order to improve the performance of the prediction data even when using the inaccurate model, the present invention is intended to improve the performance of the prediction data by employing a similarity calculation method in the similarity measuring unit 310 and a method of optimizing k every time, which has been used as a fixed number.

FIG. 2 illustrates an apparatus for generating prediction data according to an embodiment of the present invention, in which a prediction data generating unit 400 is provided to enhance the performance of the prediction data by improving a conventional method.

Referring to FIG. 2, the prediction data generating unit 400 may include a similarity measuring unit 410, a k optimizing unit 430, and a prediction unit 420.

The similarity measuring unit 410 may calculate the similarity on the basis of a modified RBF kernel method according to the present invention. In the modified RBF kernel method, which is an improved method over the conventional RBF kernel method, the similarity is calculated by using the following Equation 2.

$$s_j(Z_j, X) = \frac{\sum_{i=1}^{n} \exp\left(-\frac{\|Z_{i,j} - x_i\|^2}{2\sigma_i^2}\right)}{n} = \frac{\sum_{i=1}^{n} \exp\left(-\frac{(Z_{i,j} - x_i)^2}{2\sigma_i^2}\right)}{n} \quad \text{[Equation 2]}$$

In the conventional RBF kernel method, based on an overall prediction model encompassing values of all tags, a deviation σ is determined and the similarity is calculated. In this case, when the difference between average values of respective tags is large, the result can be distorted. For example, when an average value for a first tag is 1.0 and an average value for a second tag is 100, the second tag has much larger influence than the first tag in calculating the similarity.

In contrast, in the modified RBF kernel method proposed in the present invention, a deviation a, for each tag is determined and used, whereby the problem of the conventional RBF kernel method caused by the difference between average values of tags may be solved. Here, the deviation $\sigma_i$ used for each tag may be set based on data for each tag of the plant prediction model. In an embodiment of determining the deviation, maximum values of data for each tag and average values of data for each tag are obtained from the plant prediction model, and for each tag, the difference between the maximum value and the average value may be determined as the deviation. Alternatively, the deviation may be determined by a typical method of obtaining a standard deviation.

As an embodiment, it is assumed that there are two tags $x_1$ and $x_2$. The plant prediction model Z has the following values.

$$Z = [Z_1 \ Z_2 \ Z_m] = \begin{bmatrix} 0.9 & 1.0 & 1.1 \\ 110 & 100 & 90 \end{bmatrix}$$

The value of deviation σ may be set to 20, which may represent the largest change. The similarity (S) for each data set of the input $X=[1.0 \ 100]^T$ is obtained as $S=[0.941242 \ 1 \ 0.941242]$ from Equation 1. Thus, the similarity of the data set in the second column is the highest, and the similarity of the data sets in the first and third columns is the next highest.

Assuming $x_1$ increases by 5% such that $X=[1.05 \ 100]^T$ is input, the obtained similarity becomes $S=[0.941234 \ 0.999997 \ 0.941247]$. Meanwhile, assuming $x_2$ increases by 5% such that $X=[1.0 \ 105]^T$ is input, the obtained similarity becomes $S=[0.984610 \ 0.984617 \ 0.877414]$. Comparing these two similarities, even though $x_1$ and $x_2$ are changed equally, the influence on the similarity by $x_1$ is slight while the influence on the similarity by $x_2$ is large. As a result, the similarity is more likely to be affected by $x_2$, and errors in the prediction data are more likely to occur.

In contrast, similarities for the same inputs may be calculated by using the modified RBF kernel method proposed in the present invention. Here, $\sigma_1$ for $x_1$ is set to 0.2, and $\sigma_2$ for $x_2$ is set to 20, with the following results.

$X=[1.0 \ 100]^T$; $S=[0.882497 \ 1 \ 0.882497]$ $X=[1.05 \ 100]^T$; $S=[0.818668 \ 0.984617 \ 0.925865]$ $X=[1.0 \ 105]^T$; $S=[0.925865 \ 0.984617 \ 0.818668]$

Referring to the above results, the same change in $x_1$ and $x_2$ results in the same similarity change value. That is, in the modified RBF kernel method proposed in the present invention, the influences on the similarity are similar regardless of the average value of the respective tag. Accordingly, it is possible to generate more precise prediction data.

Furthermore, instead of using a fixed k value, the present invention obtains an optimum k value based on the similarity value calculated by the k optimizing unit 430, thereby generating the prediction data.

FIG. 3 illustrates a manner of obtaining an optimized k value, in which two tags $x_1$ and $x_2$ are represented by the two axes. The solid concentric circles represent respective data sets of the prediction model, wherein an optimum similarity 540 is calculated on the basis of a similarity maximum value 530, and the hatched center circle represents newly arrived measurement data 510. Solid round icons represent data sets of the plant prediction model and include data sets 520, 521, 522, and 523. Here, similarity is represented by the distance to the measurement data 510, and when the distance is short, the similarity is high. When the similarity has a value of 1, the measurement data and the data set are the same point.

FIG. 4 illustrates a method of obtaining an optimized k value according to an embodiment of the present invention.

Referring to FIGS. 3 and 4, the similarity measuring unit 410 calculates similarities between the input measurement data 510 and each of the data sets 520, 521, 522, and 523, respectively, and on that basis the data set having the highest similarity is found (S610). In the example of FIG. 3, the data set 521 has the highest similarity, and the similarity maximum value $S_{max}$ 530 is the similarity obtained by Equation 2 on the basis of the measurement data 510 and the data set 521.

Next, using the similarity maximum value 530, the optimum similarity 540 is calculated (S620). Here, the optimum similarity ($S_{opt}$) may be obtained by subtracting a preset parameter (α) from the similarity maximum value ($S_{max}$), that is, by using the equation $S_{opt}=S_{max}-\alpha$, where $0<|\alpha|<1$.

Next, data sets having higher similarity than the optimum similarity 540 are searched, and the number ($N_p$) of data sets is counted (S630). In the example of FIG. 3, the data sets 521, 522, and 523 are data sets having higher similarity than the optimum similarity 540, and thus $N_p=3$ is obtained.

Last, on the basis of the number (count) of data sets having higher similarity than the optimum similarity 540, the optimum k value is determined (S640). Where a maximum and minimum number of data sets to be used in prediction may have preset values, the optimum k value may be determined in the following manner.

When the number of data sets having higher similarity than the optimum similarity 540 is larger than the maximum number of data sets to be used in prediction ($N_p>N_{max}$), k is determined as the maximum number of data sets to be used in prediction ($k=N_{max}$).

When the number of data sets having higher similarity than the optimum similarity 540 is less than the maximum number of data sets to be used in prediction ($N_p<N_{max}$) and is larger than the minimum number of data sets to be used in prediction ($N_p>N_{min}$), k is determined as the number of data sets having higher similarity than the optimum similarity 540 ($k=N_p$).

When the number of data sets having higher similarity than the optimum similarity 540 is less than the minimum number of data sets to be used in prediction ($N_p<N_{min}$), k is determined as the minimum number of data sets to be used in prediction ($k=N_{min}$).

As described above, the similarity measuring unit 410 and the k optimizing unit 430 that employ the modified RBF kernel method are applied to obtain the optimum k, and based thereon, the final prediction data may be generated by the prediction unit 420. The prediction unit 420 may select, on the basis of the similarity calculated by the similarity measuring unit 410, data sets of the optimum number k calculated by the k optimizing unit 430 in order of decreasing similarity, and may generate the prediction data based on the selected data sets. In the method of generating the prediction data, the prediction data may be generated by the arithmetic average in which values of each tag in the selected data sets are simply averaged (Equation 3) or may be generated by a weighted average in which values of each tag in the selected data sets are multiplied by weights and the result is averaged (Equation 4). Here, the weight may be determined in proportion to the similarity of each data set.

$$\hat{x}_i = \frac{\sum_{j=1}^{k} Z_{i,j}}{k} \quad \text{[Equation 3]}$$

$$\hat{x}_i = \frac{\sum_{j=1}^{k} S_j \times Z_{i,j}}{\sum_{j=1}^{k} S_j} \quad \text{[Equation 4]}$$

The use of the apparatus for generating the prediction data proposed in the present invention may maximize the prediction accuracy by optimizing the similarity and the k value, even though an inaccurate model is constructed by nonspecialists.

The apparatus for generating the prediction data proposed in the present invention may be applied to an anomaly detecting apparatus of a plant to generate the prediction data, and may detect anomalies in the plant in advance by comparing the generated prediction data with the measurement data. Here, a detected anomaly may include a system fault, alarm, or similar parameter detected outside a normal state.

FIG. 5 illustrates a method of predicting data according to an embodiment of the present invention.

Referring to FIG. 5, first, the plant prediction model is constructed based on the measurement data obtained in the past (S710). Particularly, in a k-NN based model, the plant prediction model may be represented by an n-by-m matrix, where n is the number of tags indicating measured signals, and m is the number of data sets of tags.

Next, similarity between each data set of the plant prediction model and the input measurement data is calculated (S720). The similarity may be calculated by using the modified RBF kernel method. That is, the similarity may be calculated as in Equation 2, whereby the square of the difference between the value in the data set for each tag and the measurement data value is divided by the product of two and the square of the deviation (similarity for each tag), and the sum of similarity values for respective tags over all tags divided by the number of tags gives the average value.

Next, on the basis of the calculated similarity, the optimum k value is determined (S730). In the method of determining the optimum k value, as shown in FIG. 4, the optimum similarity may be calculated on basis of the similarity maximum value found among calculated similarities, data sets having higher similarity than the optimum similarity may be found, and the optimum k value may be determined depending on the number of found data sets.

When the optimum k value is thus determined, the prediction data may be generated based on the k value and the similarity calculated for each data set (S740). As an embodiment, on the basis of the calculated similarity, data sets of the determined number k are selected in order of decreasing similarity, and the prediction data may be generated on the basis of the selected data sets. In the method of generating the prediction data, the prediction data may be generated by the arithmetic average in which values of each tag in the selected data sets are simply averaged, or the prediction data may be generated by a weighted average in which values of each tag in the selected data sets are multiplied by weights and the result is averaged. Here, the weight may be determined in proportion to the similarity of each data set.

As described above, compared to the conventional prediction apparatus and method, the apparatus and method of predicting data proposed in the present invention may provide the prediction data with higher performance by using the modified similarity calculation method and the k optimization method based on similarity.

Furthermore, the modified similarity calculation method and the k optimization method based on similarity that are used in the apparatus and method proposed in the present invention may be used in anomalous signal restoration equally, thereby enhancing performance of anomalous signal restoration.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for predicting plant data, the apparatus comprising:
a plant comprising an array of sensors and at least one of a power generation plant and a chemical manufacturing plant, each of the sensors generating measurement data of multiple tags obtained from measurements performed in the plant over time; and
a processor configured to perform functions of:
generating a plant prediction model based on k-nearest neighbors (k-NN) by modeling the plant based on the measurement data, the plant prediction model containing multiple data sets, each data set having a value for each tag of the multiple tags; and
generating prediction data by measuring a similarity between the plant prediction model and the measurement data, determining a parameter k value based on the similarity, and generating plant normal state prediction data based on the determined parameter k value and the measured similarity,
wherein the generating prediction data includes:
determining similarity for each data set by measuring a similarity between each data set of the plant prediction model and the measurement data;
determining a parameter k to be used in generating the prediction data, based on the determined similarity for each data set; and
selecting k data sets in order of decreasing similarity based on the similarity for each data set and the determined parameter k, so that the prediction data is generated based on the selected k data sets.

2. The apparatus of claim 1, wherein the similarity for each data set is based on a difference between a value of each tag in each data set of the plant prediction model and a value of a corresponding tag of the measurement data, and on a preset deviation for each tag.

3. The apparatus of claim 2, wherein the similarity for each data set is determined according to $$S_j = \frac{\sum_{i=1}^{n} \exp\left(-\frac{(Z_{i,j} - x_i)^2}{2\sigma_i^2}\right)}{n}$$

where $S_j$ denotes the similarity of a data set j, $Z_{i,j}$ denotes a value of a tag i of the data set j, $x_i$ denotes a value of the tag i of the measurement data, $\sigma_i$ denotes the preset deviation of the tag i, and n denotes a number of tags.

4. The apparatus of claim 1, wherein the parameter k is determined by
setting an optimum similarity;
searching the multiple data sets for data sets having higher similarity than the optimum similarity and counting a number of data sets having higher similarity; and
comparing the counted number with a preset maximum value and a preset minimum value of the parameter k.

5. The apparatus of claim 4, wherein the determining the parameter k includes:
obtaining a similarity maximum value by comparing similarities of the data sets, and
setting the optimum similarity by subtracting a preset parameter from the similarity maximum value,
wherein the preset parameter is a value between zero and one.

6. The apparatus of claim 1, wherein the generating prediction data further includes generating the prediction data by a weighted average in which values of each tag in the selected k data sets are multiplied by weights proportional to similarities of the data sets, and the result is averaged.

7. The apparatus of claim 1, wherein the processor is further configured to perform a function of determining anomalies of the plant by comparing the prediction data with the measurement data.

8. A method of predicting plant data, the method comprising:
receiving measurement data of multiple tags from an array of sensors installed in a plant comprising at least one of a power generation plant and a chemical manufacturing plant, each of the sensors generating the measurement data of the multiple tags obtained from measurements performed in the plant over time;
generating a plant prediction model based on k-nearest neighbors (k-NN) by modeling a plant based on measurement data of multiple tags; and
generating prediction data by measuring a similarity between the plant prediction model and the measurement data, determining a parameter k value based on the similarity, and generating plant normal state prediction data based on the determined parameter k value and the measured similarity,
wherein the generating prediction data includes:
determining similarity for each data set by measuring a similarity between each data set of the plant prediction model and the measurement data;
determining a parameter k to be used in generating the prediction data, based on the determined similarity for each data set; and
selecting k data sets in order of decreasing similarity based on the similarity for each data set and the determined parameter k, so that the prediction data is generated based on the selected k data sets.

9. The method of claim 8, wherein the similarity determining includes:
determining the similarity for each data set based on a difference between a value for each tag in each data set of the plant prediction model and a value of a corresponding tag of the measurement data, and on a preset deviation for each tag.

10. The method of claim 9, wherein the similarity for each data set is determined according to $$S_j = \frac{\sum_{i=1}^{n} \exp\left(-\frac{(Z_{i,j} - x_i)^2}{2\sigma_i^2}\right)}{n}$$

where $S_j$ denotes the similarity of a data set j, $Z_{i,j}$ denotes a value of a tag i of the data set j, $x_i$ denotes a value of the tag i of the measurement data, $\sigma_i$ denotes the preset deviation of the tag i, and n denotes a number of tags.

11. The method of claim 8, wherein the parameter k to be used in generating the prediction data is determined by
setting an optimum similarity;
searching the multiple data sets for data sets having higher similarity than the optimum similarity and counting a number of data sets having higher similarity; and
comparing the counted number with a preset maximum value and a preset minimum value of the parameter k.

12. The method of claim 11, wherein the optimum similarity is set by obtaining a similarity maximum value by comparing similarities of the data sets and by subtracting a preset parameter from the similarity maximum value, wherein the parameter is a value between zero and one.

13. The method of claim 8, wherein the generating of the prediction data includes generating the prediction data by a weighted average in which values of each tag in the selected k data sets are multiplied by weights proportional to similarities of the data sets, and the result is averaged.

14. The method of claim 8, further comprising:
   determining anomalies of the plant by comparing the prediction data and the measurement data.

\* \* \* \* \*